C. HUNTER.
NUT LOCK.
APPLICATION FILED JULY 8, 1912.
1,048,539.  Patented Dec. 31, 1912.
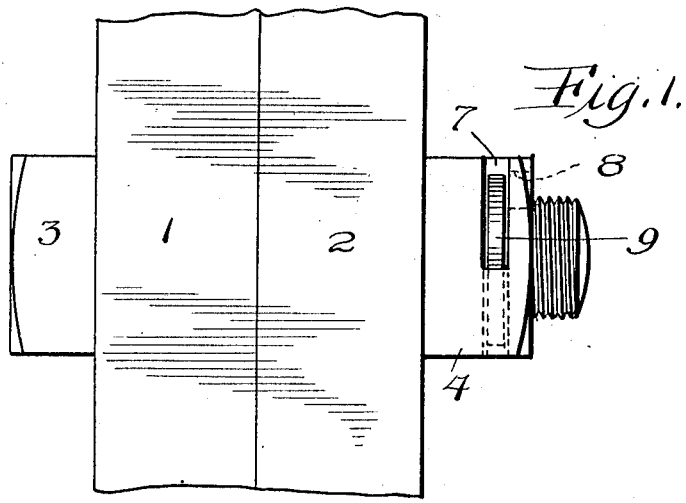
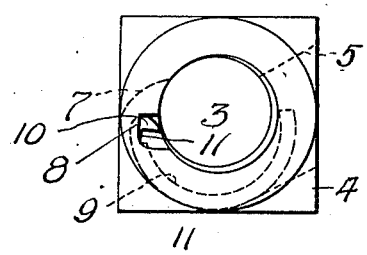 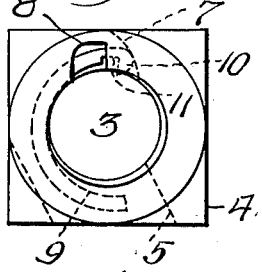 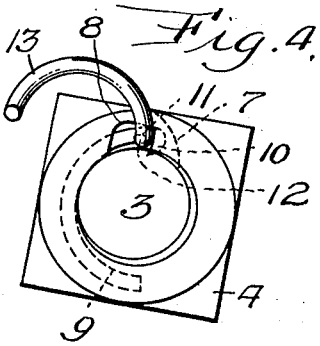
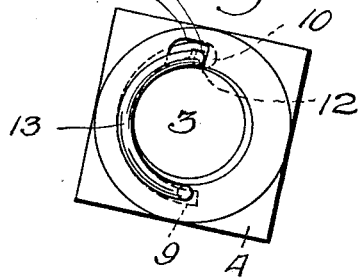 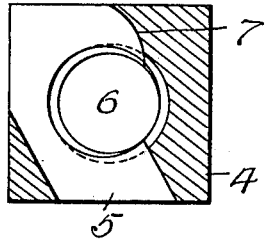 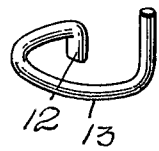
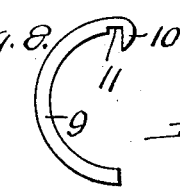
WITNESSES
INVENTOR
By C. Hunter.
ATTORNEYS
COLUMBIA PLANOGRAPH CO., WASHINGTON, D. C.

UNITED STATES PATENT OFFICE.

CHARLES HUNTER, OF RAYLAND, OHIO, ASSIGNOR OF ONE-FOURTH TO E. ROLAND COLE, OF SMITHFIELD, PENNSYLVANIA.

NUT-LOCK.

1,048,539.  Specification of Letters Patent.  Patented Dec. 31, 1912.

Application filed July 8, 1912.  Serial No. 708,147.

*To all whom it may concern:*

Be it known that I, CHARLES HUNTER, a citizen of the United States of America, residing at Rayland, in the county of Jefferson and State of Ohio, have invented certain new and useful Improvements in Nut-Locks, of which the following is a specification, reference being had therein to the accompanying drawing.

This invention relates to a nut locking device, and the objects of my invention are to provide a nut locking device that can be used in connection with the ordinary type of bolt for preventing a nut from becoming accidentally displaced from said bolt, and to provide a nut lock that can be advantageously used in connection with rail joints, bridges, rolling stock and structures that are subjected to vibration which have a tendency to displace nuts.

Further objects of my invention are to furnish a nut with a novel locking member for engaging the threads of a bolt and preventing a counter-clockwise or rearward movement of the nut relatively to the bolt and to accomplish the above results by a nut locking device that is simple in construction, durable, easy to install and highly efficient for the purposes for which it is intended.

With the above and other objects in view, the invention resides in a novel construction to be hereinafter specifically described and then claimed, and reference will now be had to the drawing, wherein:—

Figure 1 is a side elevation of a nut locking device in accordance with this invention. Fig. 2 is an end view of the same showing the device in an unlocked position. Fig. 3 is a similar view showing the device in a locked position. Fig. 4 is a similar view showing a key in position for releasing the nut locking device. Fig. 5 is a similar view showing the device unlocked. Fig. 6 is a cross sectional view of a nut in accordance with this invention. Fig. 7 is a perspective view of the key employed for unlocking the device, and Fig. 8 is an elevation of a detached locking member.

The reference numerals 1 and 2 denote, by the way of an example, pieces of material that are held together by a bolt 3 and a nut 4. The nut 4, adjacent to the outer face thereof is provided with a diagonally disposed slot 5 that intersects the bore 6 of the nut. One of the walls of the slot 5 presents a curved surface 7 constituting a cam. The outer face of the nut 4, adjacent to the cam 7, is provided with an opening 8 that is in communication with the slot 5. Located within the slot 5 of the nut 4 is a semi-circular locking member 9 having a hook shaped or pronged end 10 adapted to engage the threads of the bolt 3.

After the locking member 9 is placed in the slot 5, the nut 4 can be screwed upon the bolt against the piece of material 2, the hook shaped end of the locking member 9 riding over the threads of the bolt until the nut 4 is firmly seated against the piece of material 2. By then partially rotating the nut 4 to the rear or counter-clockwise, the cam 7 engages the hook shaped end 10 of the locking member 9 and forces this end of the member into engagement with the threads of the bolt, thereby preventing a further counter-clockwise movement of the nut.

To remove the nut 4, it is necessary that the nut be further tightened, whereby the opening 8 will expose the hook shaped end 10 of the locking member 9. Adjacent to the hook shaped end 10 of the locking member 9 is a recess 11 and adapted to extend into said recess through the opening 8, is the oval end 12 of a curved key 13 that is employed for shifting the locking member 9, whereby the nut 4 can be unscrewed. The key 13 as shown in Fig. 7 is made of a rigid piece of wire and as shown in Fig. 4, the oval end 12 thereof is in the recess 11 and in position to raise the hook shaped end of the locking member 9. This is accomplished by swinging the key 13 downwardly to the position shown in Fig. 5, said key forcing the hook shaped end of the locking member 9 out of engagement with the threads of the bolt 3, whereby the nut 4 can be unscrewed.

From the foregoing it will be observed that the present type of nut can be constructed to accommodate the locking member 9, and that the key 13 can be repeatedly used for unlocking the nut locking device.

It is thought that the utility of the nut locking device will be apparent without further description, and while in the drawing there is illustrated a preferred embodiment of the invention, it is to be understood that the structural elements are susceptible to such changes as fall within the scope of the appended claim.

What I claim is:—

In a nut locking device, the combination with a bolt, and a nut adapted to be screwed upon said bolt, said nut having a slot formed diagonally thereof and presenting a cam surface, said nut having the outer face thereof provided with an opening in communication with said slot adjacent to the cam surface thereof, of a semi-circular locking member arranged in the slot of said nut and having a hook shaped end adapted to be forced into engagement with the threads of said bolt by the cam surface of said nut, and a key adapted to be inserted through the opening in the outer face of said nut to engage under the hook shaped end of said locking member and remove the hook shaped end of said member from the threads of said bolt.

In testimony whereof I affix my signature in the presence of two witnesses.

CHARLES HUNTER.

Witnesses:
Thos. M. Wolfe,
Wm. E. Wolfe.

Copies of this patent may be obtained for five cents each, by addressing the "Commissioner of Patents, Washington, D. C."